United States Patent [19]
Klosek et al.

[11] Patent Number: 5,806,298
[45] Date of Patent: Sep. 15, 1998

[54] GAS TURBINE OPERATION WITH LIQUID FUEL VAPORIZATION

[75] Inventors: Joseph Klosek, Wescosville; Donald Winston Woodward, New Tripoli, both of Pa.

[73] Assignee: Air Products and Chemicals, Inc., Allentown, Pa.

[21] Appl. No.: 717,059

[22] Filed: Sep. 20, 1996

[51] Int. Cl.[6] .............................. F02C 3/22; F02C 7/143
[52] U.S. Cl. ...................... 60/39.06; 60/39.465; 60/728
[58] Field of Search ................................ 60/39.02, 39.06, 60/39.465, 728

[56] References Cited

U.S. PATENT DOCUMENTS

| | | | |
|---|---|---|---|
| 2,559,814 | 7/1951 | Whittle | 60/728 |
| 3,313,103 | 4/1967 | Johnson | 60/39.06 |
| 3,788,066 | 1/1974 | Nebgen | 60/39.05 |
| 3,796,045 | 3/1974 | Foster-Pegg | 60/39.02 |
| 3,877,218 | 4/1975 | Nebgen | 60/39.05 |
| 4,036,028 | 7/1977 | Mandrin | 60/39.465 |
| 4,424,667 | 1/1984 | Fanning | 60/39.181 |
| 4,946,477 | 8/1990 | Perka et al. | 48/197 |
| 5,179,129 | 1/1993 | Studer | 518/700 |
| 5,284,878 | 2/1994 | Studer et al. | 518/700 |
| 5,669,217 | 9/1997 | Anderson | 60/39.05 |

FOREIGN PATENT DOCUMENTS

| | | | |
|---|---|---|---|
| 128938 | 7/1985 | Japan | 60/728 |

OTHER PUBLICATIONS

Ondryas et al, "Options in Gas Turbine Power Augmentation Using Inlet Air Chilling", *Transactions of the ASME, Journal of Engineering for Gas Turbines and Power*, vol. 113, Apr. 1991, pp. 203–211.

Jerica et al, "Combined Cycle Enhancements", *Transactions of the ASME, Journal of Engineering for Gas Turbines and Power*, vol. 113, Apr. 1991, pp. 198–202.

Johnson, R. S., "Theory and Operation of Evaporative Coolers for Industrial Gas Turbine Installations", ASME Paper 88–GT–41, Jun. 1988.

"Off–Peak Ice Chills Inlet Air to Boost Gas Turbine Output", *Power Eng.*, Nov. 1991, p. 108.

Ondryas, I. S., "Go Beyond Evaporative Colers to Stretch Gas–Turbine Output", Power, Jul. 1991, pp. 27–29.

"Economic Evaluation of the Coproduction of Methanol and Electricity With Texaco Gasification–Combined–Cycle Systems", *EPRI Report AP–2212*, Jan. 1982.

"Coproduction of Methanol and Electricity", *EPRI Report AP–3749*, Oct. 1984.

Sorensen, J.C., et al., "Methanol Fuel Coproduction With Coal Gasification Combined–Cycle Power", Power–Gen '90, Orlando, FL, 4–6 Dec. 1990.

*Primary Examiner*—Louis J. Casaregola
*Attorney, Agent, or Firm*—John M. Fernbacher

[57] ABSTRACT

The power output of a gas turbine is increased by vaporizing a liquid coolant fuel at the inlet of the air compressor, which cools the air and increases the mass throughput of the compressor. The method preferably is used in a gas turbine-driven power generation system for increased power output and particularly during periods of high ambient temperatures or at a high site elevation. The liquid coolant fuel also can be introduced simultaneously into the gas turbine combustor to supplement the normal combustor fuel.

5 Claims, 1 Drawing Sheet

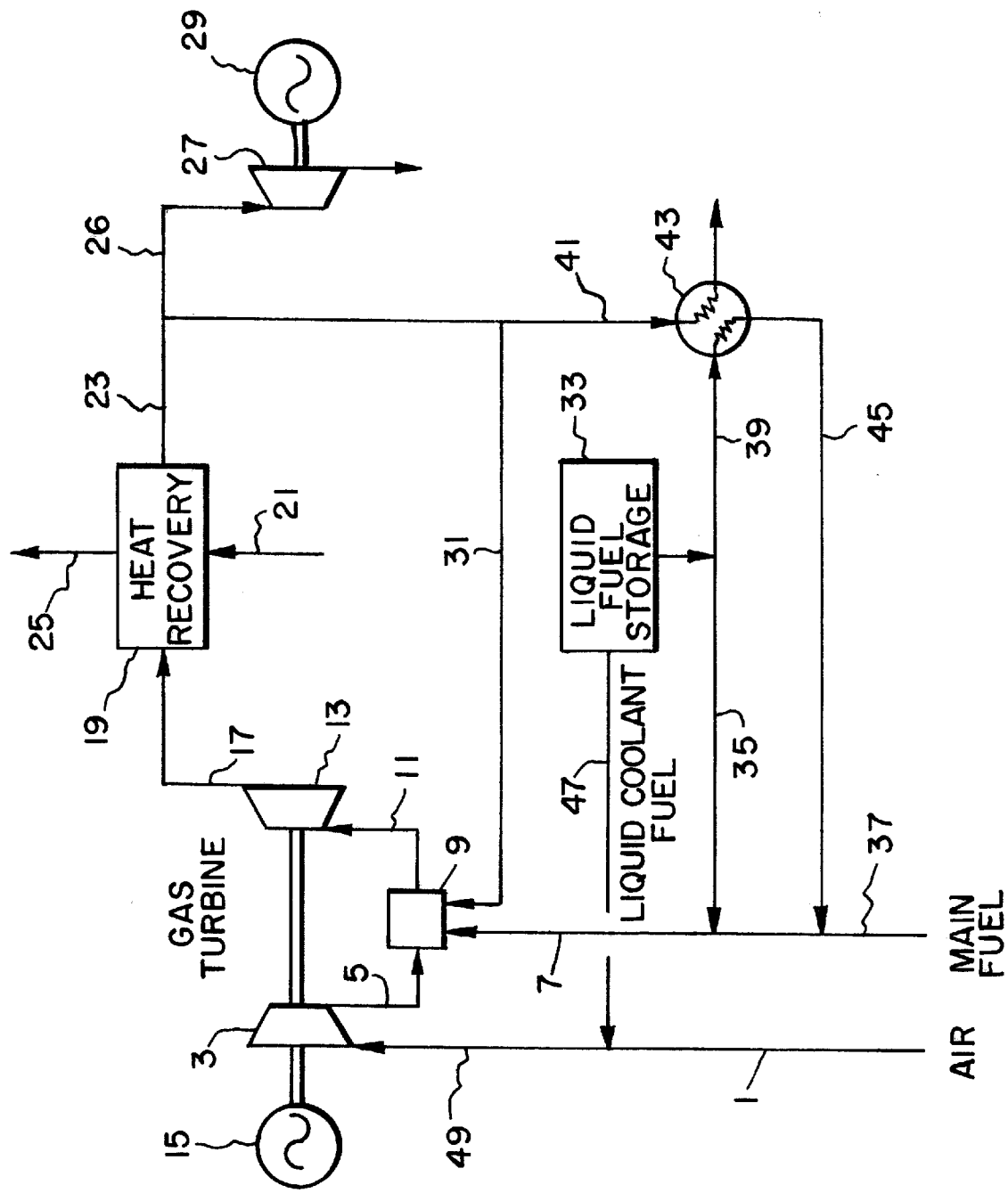

GAS TURBINE OPERATION WITH LIQUID FUEL VAPORIZATION

TECHNICAL FIELD OF THE INVENTION

This invention pertains to the operation of a gas turbine power generation system, and in particular to the use of liquid coolant fuel under high ambient temperature or high altitude conditions.

BACKGROUND OF THE INVENTION

Gas turbine systems are widely used to generate electric power from fuels including natural gas, hydrocarbon liquid fuels, and synthesis gas from the gasification of coal, coke, or oil. High efficiency gas turbine systems typically are operated in a combined cycle arrangement in which the gas turbine drives an electric generator, and steam raised by heat from the turbine exhaust drives a steam turbine and the same or a second electric generator.

Gas turbine systems often operate in a peaking mode in which power output must be maximized for periods to meet high power demand, for example on hot days with high ambient temperatures. Other systems must operate continuously at high power output, high ambient temperature, and/or at high elevation. Unfortunately, gas turbine capacity decreases at higher ambient temperatures and high altitudes because the mass throughput capacity of the gas turbine air compressor decreases as the air density decreases. In order to alleviate this problem, the inlet air to the gas turbine compressor can be cooled and the density thereby increased using various methods known in the art such as mechanical refrigeration, absorption refrigeration, indirect evaporative cooling, and thermal energy storage.

Methods for inlet air cooling are reviewed in a paper entitled "Options in Gas Turbine Power Augmentation Using Inlet Air Chilling" by I. S. Ondryas et al in the *Transactions of the ASME, Journal of Engineering for Gas Turbines and Power*, Vol. 113, April 1991, pp. 203–211. Other representative art is disclosed in papers by H. Jerica et al entitled "Combined Cycle Enhancements" in *Transactions of the ASME, Journal of Engineering for Gas Turbines and Power*, Vol. 113, April 1991, pp. 198–202; by R. S. Johnson entitled "Theory and Operation of Evaporative Coolers for Industrial Gas Turbine Installations", ASME Paper 88-GT-41, June 1988; and by I. S. Ondryas entitled "Go Beyond Evaporative Coolers to Stretch Gas Turbine Output" in *Power*, July 1991, pp. 27–29. The use of ice for inlet air cooling is described in an article entitled "Off-Peak Ice Chills Inlet Air to Boost Gas Turbine Output" in *Power Eng.*, November 1991, p. 108. Technology for inlet air cooling also is disclosed in representative U.S. Pat. Nos. 3,788,066, 3,796,045, 3,877,218, and 4,424,667.

These methods for cooling the compressor inlet air in gas turbine systems utilize capital-intensive process equipment, and also increase the cost and complexity of the gas turbine system operation. Simpler, less capital-intensive methods are desirable for inlet air cooling during conditions of high ambient temperature or high site elevation. The invention described below and defined in the claims which follow is a simple, low-capital method for inlet air cooling under such conditions.

SUMMARY OF THE INVENTION

In the operation of a gas turbine-driven power generation system wherein a stream of feed air is introduced into the inlet of an air compressor, the air is compressed and combusted with a gas turbine fuel in a combustor to generate a hot combustion product gas, and the hot combustion product gas is expanded in a gas turbine expander to generate work which drives the air compressor and an electric generator. According to the present invention, the amount of work produced by the gas turbine expander is increased by a method which comprises introducing a liquid coolant fuel into the stream of feed air and vaporizing the liquid coolant fuel prior to the air compressor, thereby cooling the feed air, increasing the mass air flow through the compressor, and increasing the work output of the gas turbine expander. The amount of liquid coolant fuel is controlled such that the resulting air-fuel mixture is below the lower flammability limit of the mixture at any point following the vaporizing of the liquid coolant fuel. The liquid coolant fuel can be methanol, liquefied natural gas, or any other readily vaporizable fuel.

The main gas turbine fuel (to the gas turbine combustor) can be synthesis gas containing hydrogen and carbon monoxide generated by the gasification of a carbonaceous feedstock. Methanol optionally is produced from at least a portion of the synthesis gas by the catalytic reaction of hydrogen and carbon monoxide. This methanol typically is produced during periods of lower demand for the electric power produced by the electric generator, and at least a portion of the methanol provides the liquid coolant fuel which is introduced into the stream of feed air to the air compressor during periods of higher demand for the power. Another portion of the methanol can provide a portion of the gas turbine fuel during periods of higher demand for the electric power.

Optionally, the gas turbine fuel is provided at least in part by a portion of a primary liquid fuel. Preferably, another portion of this primary liquid fuel provides the liquid coolant fuel. The primary liquid fuel can be methanol, liquefied petroleum gas, or liquefied natural gas.

BRIEF DESCRIPTION OF THE DRAWING

The single FIGURE is a schematic flowsheet of a gas turbine power generation system illustrating the selected use of liquid coolant fuel of the present invention.

DETAILED DESCRIPTION OF THE INVENTION

The output of a typical gas turbine-driven power generation system fluctuates daily and seasonally due to varying power demand and changing ambient temperatures. Such power generation systems typically are designed to operate at maximum capacity at ISO conditions: 59° F. ambient temperature, sea level elevation, and 60% relative humidity. Capacity is typically reduced by high ambient temperature or high altitude, which act to thin the air. At high ambient temperatures, which often correspond to periods of peak power demand, the gas turbine compressor inlet air capacity can be restored by cooling using methods known in the art in order to increase compressor throughput and power output.

The present invention is a method for utilizing a liquid coolant fuel to increase the throughput of the gas turbine compressor by vaporizing the liquid coolant fuel at the compressor inlet, thereby cooling and increasing the density of the inlet air. The coolant fuel is distinguished from the main gas turbine fuel by its routing and service, though the same fuel material may be used in both services; in general, however, the main gas turbine fuel can be any fuel. The heating value of the coolant fuel is recovered in the combustor where the vaporized fuel is combusted with the main gas turbine fuel. Thus the use of liquid coolant fuel in this manner serves two functions simultaneously—cooling the compressor inlet air and increasing the combustor heat duty. The invention is particularly useful in a gas turbine power generation system in which peak power demand coincides with high ambient temperatures.

The invention is described in conjunction with a conventional gas turbine combined cycle power generation system in the single FIGURE. Inlet air 1 is compressed to 150–450 psia in compressor 3 to provide compressed air 5 which is combusted with main fuel 7 in gas turbine combustor 9. The resulting hot pressurized combustion product 11 is expanded to near atmospheric pressure through expansion turbine 13 to generate shaft power which drives compressor 3 and electric generator 15. Hot turbine exhaust 17 passes to heat recovery section 19 which converts boiler feedwater 21 to high pressure steam 23 and discharges final exhaust gas 25 to the atmosphere. A portion 26 of steam 23 is expanded through steam turbine 27 to drive additional electric generator 29. Another portion 31 of steam 23 can be introduced into combustor 9 for control of nitrogen oxides in final exhaust gas 25.

Liquid coolant fuel is stored in liquid fuel storage 33 for use during periods of high ambient temperature and peak power demand. During such periods, some liquid fuel 35 is optionally combined directly with fuel 37, any gas turbine fuel, to yield combustor main fuel 7. Alternatively, portion 39 of the liquid fuel is optionally vaporized against steam 41 in vaporizer 43 to yield vaporized fuel 45, which is combined with fuel 37 to yield combustor main fuel 7. The need to vaporize optional liquid fuel depends upon the specific design of combustor 9.

In the method of the present invention, some or all of the liquid coolant fuel is provided by liquid coolant fuel 47 which is injected into feed air 1 and vaporized to form cooled air-fuel mixture 49 as the inlet gas to compressor 3. The compressor inlet stream 49 is more dense and results in a higher mass flow through the constant volume compressor 3. The use of liquid coolant fuel 47 to provide supplemental fuel maximizes the degree of cooling obtained at the inlet of compressor 3, which is particularly desirable when the peak power demand coincides with the maximum ambient temperature.

If the peak power demand occurs at a lower ambient temperature, the introduction of the liquid coolant fuel 47 may be beneficial, but will be limited in some cases by the potential for water freezing at the inlet to compressor 3. In such cases, an appropriate portion of liquid fuel may be supplied as fuel streams 35 or 45 in order to prevent damage from ice entering compressor 3.

The liquid coolant fuel can be any liquid fuel compatible with the gas turbine system which vaporizes near or below ambient temperature such that vaporization is achieved simply by injecting or spraying the liquid into feed air 1 without the addition of heat. The temperature drop due to vaporization should not cause ice formation at the inlet of compressor 3 by condensation and freezing of water vapor in feed air 1.

Volatile organic liquids, particularly methanol, are satisfactory liquid coolant fuels. Methanol can be a preferred coolant fuel if combustor fuel gas 37 is synthesis gas containing hydrogen and carbon monoxide produced by the gasification of carbonaceous material. In this case, methanol can be synthesized readily by known methods (not shown) from a portion of fuel gas 37 during periods of low power demand and held in liquid fuel storage 33 for later use during periods of high power demand. Liquid coolant fuel also can be provided by light hydrocarbons such propane, liquefied petroleum gas (LPG), and the like which can be stored conveniently as liquids.

The main gas turbine fuel 37 can be natural gas obtained by pipeline, or by onsite vaporization of stored liquefied natural gas (LNG). In this latter case, no separate liquid coolant fuel is needed and a portion of the stored LNG can be used as liquid coolant fuel 47 for vaporization at the compressor inlet according to the present invention.

Liquid coolant fuel can also be injected into the compressor air at intermediate locations or interstages of the gas turbine air compressor, in addition to the compressor suction.

Because the present invention involves vaporizing flammable components in a stream of air, it is critically important that the composition of inlet gas 49 to compressor 3 be controlled safely below the lower flammability limit at any point following the vaporization step and in particular at the pressures and temperatures expected in compressor 3. The lower flammability limit is defined herein as the minimum concentration of fuel needed to support combustion, in air, if ignited. The lower flammability limit is a complex function of temperature, pressure, gas composition, and the combustion characteristics of supplemental fuel 47. Methods to predict the flammability limits of such mixtures are described in papers by J. G. Hansel et al entitled "Predicting and Controlling Flammability of Multiple Fuel and Multiple Inert Mixtures" in *Plant/Operation Progress*, Vol. 11, No. 4, October 1992, pp. 213–217 and by H. H. Gunardson et al entitled "Flammability Assessment in Petrochemical Oxidation Processes" in *Hydrocarbon Technology International Quarterly*, Summer 1995, pp. 69–74.

In many gas turbine systems, some of the compressed air from the compressor is used to cool the blades in the expansion turbine as well as other critical areas. Since these blades and other areas typically operate at elevated temperatures above the autoignition temperature of compressed gas 5, this compressed gas should not be used for such cooling service. Instead, compressed air, inert gas, or steam from a separate source should be used for this purpose.

In order to illustrate the effect of ambient temperature on the operation of a gas turbine power generation system and to show the benefit of the present invention, process calculations were carried out as described in the following Examples.

EXAMPLE 1

The gas turbine system shown in the single FIGURE is operated conventionally with natural gas as main fuel 37 and methanol as vaporized fuel 45. 221,000 lb/hr of fuel 37 is combined with 55,000 lb/hr methanol 45 (vaporized by steam 41 in vaporizer 43) and the combined fuel 7 is combusted with 3,032,000 lb/hr of compressed air 5. 230,000 lb/hr of steam 31 is injected into combustor 9. The ambient air temperature is 59° F. the relative humidity is 60%, and the gas turbine is designed to be fully loaded at this temperature. Heat recovery system 19 and steam turbine 27 are used to operate generator 29. The system generates 272.8 MW of power, which is the design power output of the system.

EXAMPLE 2

The gas turbine system of Example 1 is operated at an ambient temperature of 100° F. and a relative humidity of 15%. Air feed stream 49 to compressor 3 decreases by 7.8%, and fuel stream 7 is decreased to maintain the design temperature at the inlet of expansion turbine 13. The total power generated by the system is 250.0 MW, or a decrease of 8.4% from the design case of Example 1. This illustrates the effect of high ambient temperature on the gas turbine system power output.

EXAMPLE 3

The system of Example 2 is operated with a freon refrigeration system (not shown) which cools air stream 49 to 59° F. and 60% relative humidity prior to compressor 3, thus restoring the compressor inlet conditions to those of Example 1. After taking into account the power requirement of the freon refrigeration system (1.7 MW), the system net power output is 271.1 MW, a decrease of 0.6% from design. While the power output is nearly restored to the design output, the capital cost of the freon refrigeration system increases the net power cost compared with Example 1.

EXAMPLE 4

The system of Example 2 is operated at 100° F. air inlet to compressor 3, but steam 31 to combustor 9 is increased to 340,000 lb/hr to increase the output of generator 15 to the design level of 192 MW. The total power output of generators 15 and 29 is 266.3 MW, or 2.4% below the design case of Example 1.

EXAMPLE 5

The system of Example 2 is operated at 100° F. air inlet to compressor 3, but liquid methanol fuel 35 is combined with fuel gas 37 to combustor 9. Steam 31 is increased to 404,000 lb/hr to bring the output of generator 15 to design capacity. No steam is needed for vaporizer 43. The net power of the system is 263.1 MW, or 3.6% below the design capacity of Example 1.

EXAMPLE 6

The system of Example 2 is operated at 100° F. ambient air temperature, and according to the present invention with all of the 55,000 lb/hr of liquid methanol introduced as liquid coolant fuel stream 47 and vaporized in air feed 1 to yield cooled air-methanol mixture 49 to compressor 3. This increases the mass air flow to compressor 3 to 3,032,000 lb/hr, which is identical to the design case of Example 1. Cooled air-methanol mixture 49 is non-flammable. No steam is needed for vaporization of methanol. The total power output of the system is 273.9 MW, or an unexpected 0.4% increase over the design power output of Example 1. This is achieved without the expense of a refrigeration system.

The results of the simulations of Examples 1–6 are summarized in Table 1. It is seen that none of the operating modes of Examples 2–5 return the system operation to the design power output of Example 1. The method of the invention as illustrated in Example 6, however, increases the system power output at 100° F. ambient to slightly above the design value at 59° F. ambient in Example 1.

Thus the present invention enables the operation of a gas turbine power generation system at high ambient temperatures while maintaining the design power output normally achieved at a lower ambient temperature. The invention also allows the operation of a system at high site elevation to generate additional power based on the same principle of increasing the density of the feed air. The benefit of the invention is accomplished by the simple method of vaporizing a liquid coolant fuel in the gas turbine compressor inlet, which requires little additional equipment and has a low capital cost. This liquid coolant fuel may be the same as the main fuel used in the gas turbine system, but the main fuel can be any gas turbine fuel. Careful control of the compressor gas inlet composition below the flammability limit is required, and is readily accomplished using available methods of determining these limits.

The essential characteristics of the present invention are described completely in the foregoing disclosure. One skilled in the art can understand the invention and make various modifications without departing from the basic spirit of the invention, and without deviating from the scope and equivalents of the claims which follow.

TABLE 1

| Example | Ambient Temp., °F. | Relative Humidity, % | Fuel Flow to Combustor, k lbs/hr | | Flow at Compressor Inlet, k lbs/hr. | | Methanol vaporized by stream? | Steam to Combustor, k lbs/hr. | Total Power, MW | Relative Power |
|---|---|---|---|---|---|---|---|---|---|---|
| | | | Fuel Gas | Methanol | Air | Methanol | | | | |
| 1 | 59 | 60 | 221 | 55 | 3032 | 0 | yes | 230 | 272.8 | 1.000 |
| 2 | 100 | 15 | 201 | 50 | 2796 | 0 | yes | 210 | 250.0 | 0.916 |
| 3 | 100 | 15 | 221 | 55 | 3032 | 0 | yes | 230 | 271.1 | 0.994 |
| 4 | 100 | 15 | 219 | 55 | 2871 | 0 | yes | 340 | 266.3 | 0.976 |
| 5 | 100 | 15 | 220 | 55 | 2539 | 0 | no | 404 | 263.1 | 0.964 |
| 6 | 100 | 15 | 222 | 55 | 3032 | 55 | no | 230 | 273.9 | 1.004 |

We claim:

1. In the operation of a gas turbine-driven power generation system wherein a stream of feed air is introduced into the inlet of an air compressor, the air is compressed and combusted with synthesis gas containing hydrogen and carbon monoxide in a combustor to generate a hot combustion product gas, and the hot combustion product gas is expanded in a gas turbine expander to generate work which drives the air compressor and an electric generator, the improvement which comprises producing methanol from at least a portion of the synthesis gas by the catalytic reaction of hydrogen and carbon monoxide, and increasing the amount of work produced by the gas turbine expander by introducing at least a portion of the methanol into the stream of feed air and vaporizing the portion of methanol prior to the air compressor, thereby cooling the feed air, increasing the mass air flow through the compressor, and increasing the work output of the gas turbine expander.

2. The method of claim 1 wherein the amount of methanol introduced into the stream of feed air is controlled such that the resulting air-fuel mixture is below the lower flammability limit of the mixture at any point following the vaporizing of the liquid coolant fuel.

3. The method of claim 1 wherein the synthesis gas containing hydrogen and carbon monoxide is generated by the gasification of a carbonaceous feedstock.

4. The method of claim 1 wherein the methanol is produced during periods of lower demand for the electric power produced by the electric generator, and wherein the portion of the methanol is introduced into the stream of feed air to the air compressor during periods of higher demand for the power.

5. The method of claim 1 wherein another portion of the methanol is introduced into the combustor during periods of higher demand for the electric power.

* * * * *